United States Patent
Takenaka et al.

(10) Patent No.: US 10,666,860 B2
(45) Date of Patent: May 26, 2020

(54) IMAGE PROCESSOR, IMAGE PROCESSING METHOD AND PROGRAM, AND IMAGING SYSTEM

(71) Applicant: RICOH COMPANY, LTD., Tokyo (JP)

(72) Inventors: Hirokazu Takenaka, Kawasaki (JP); Noriyuki Terao, Sendai (JP); Yoshiaki Irino, Kawasaki (JP); Tomonori Tanaka, Yokohama (JP); Nozomi Imae, Yokohama (JP); Toru Harada, Kawasaki (JP); Hideaki Yamamoto, Yokohama (JP); Kensuke Masuda, Kawasaki (JP); Yoichi Ito, Machida (JP); Satoshi Sawaguchi, Yokohama (JP); Daisuke Bessho, Kawasaki (JP); Hiroyuki Satoh, Yokohama (JP); Makoto Shohara, Hachioji (JP); Shusaku Takasu, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 410 days.

(21) Appl. No.: 14/022,987

(22) Filed: Sep. 10, 2013

(65) Prior Publication Data
US 2014/0071227 A1 Mar. 13, 2014

(30) Foreign Application Priority Data

Sep. 11, 2012 (JP) .................................. 2012-199320
Jun. 13, 2013 (JP) .................................. 2013-124397

(51) Int. Cl.
H04N 5/232 (2006.01)
(52) U.S. Cl.
CPC .............................. H04N 5/23238 (2013.01)

(58) Field of Classification Search
None
See application file for complete search history.

(56) References Cited

U.S. PATENT DOCUMENTS 5,990,941 A 11/1999 Jackson et al.
6,002,430 A * 12/1999 McCall ............. H04N 5/23238
348/143
(Continued)

FOREIGN PATENT DOCUMENTS

| JP | 11-018007 | 1/1999 |
| JP | 11-205648 A | 7/1999 |

(Continued)

OTHER PUBLICATIONS

Japanese Office Action for JP 2013-188200, dated Jul. 14, 2015 (with English translation).

(Continued)

*Primary Examiner* — Dave Czekaj
*Assistant Examiner* — Samuel D Fereja
(74) *Attorney, Agent, or Firm* — Xsensus LLP

(57) ABSTRACT

An image processor includes a first converter to convert input images into images in a different coordinate system from that of the input images according to first conversion data based on a projection model, a position detector to detect a connecting position of the images converted by the converter, a corrector to correct the first conversion data on the basis of a result of the detection by the position detector, and a data generator to generate second conversion data for image synthesis from the conversion data corrected by the corrector on the basis of coordinate conversion, the second conversion data defining the conversion of the input images.

19 Claims, 15 Drawing Sheets

(56) References Cited

U.S. PATENT DOCUMENTS

| | | | | |
|---|---|---|---|---|
| 6,304,285 B1* | 10/2001 | Geng | | G06T 7/0022 348/36 |
| 6,331,869 B1* | 12/2001 | Furlan | | H04N 5/2259 348/36 |
| 6,393,162 B1 | 5/2002 | Higurashi | | |
| 6,795,113 B1 | 9/2004 | Jackson et al. | | |
| 7,176,960 B1* | 2/2007 | Nayar | | G06T 3/4038 348/207.99 |
| 8,391,640 B1* | 3/2013 | Jin | | G06T 3/0062 382/284 |
| 8,743,219 B1* | 6/2014 | Bledsoe | | G06T 5/006 348/208.4 |
| 2003/0133008 A1* | 7/2003 | Stephenson | | H04N 5/2251 348/47 |
| 2004/0046888 A1* | 3/2004 | Jan | | G02B 13/06 348/335 |
| 2005/0180656 A1* | 8/2005 | Liu | | G06K 9/00228 382/284 |
| 2006/0023105 A1* | 2/2006 | Kostrzewski | | G06T 3/0018 348/335 |
| 2007/0132863 A1* | 6/2007 | Deguchi | | G06T 3/4038 348/239 |
| 2007/0236595 A1* | 10/2007 | Pan | | G06T 3/0018 348/335 |
| 2008/0030573 A1* | 2/2008 | Ritchey | | H04N 7/18 348/36 |
| 2009/0040291 A1* | 2/2009 | McCall | | H04N 5/2259 348/36 |
| 2010/0045773 A1* | 2/2010 | Ritchey | | G02B 13/06 348/36 |
| 2010/0053325 A1* | 3/2010 | Inagaki | | G06T 3/0062 348/143 |
| 2010/0119172 A1* | 5/2010 | Yu | | G06T 5/006 382/256 |
| 2011/0091065 A1* | 4/2011 | Chandrashekar | | G06K 9/4671 382/100 |
| 2011/0115879 A1* | 5/2011 | Homma | | G03B 17/02 348/36 |
| 2011/0234750 A1* | 9/2011 | Lai | | G03B 37/04 348/37 |
| 2011/0316968 A1* | 12/2011 | Taguchi | | H04N 5/23238 348/36 |
| 2012/0093365 A1* | 4/2012 | Aragane | | H04N 7/15 382/103 |
| 2012/0098926 A1* | 4/2012 | Kweon | | G06T 1/00 348/36 |
| 2012/0105578 A1* | 5/2012 | Ohmiya | | H04N 5/23238 348/36 |

FOREIGN PATENT DOCUMENTS

| | | |
|---|---|---|
| JP | H11-508384 A | 7/1999 |
| JP | 2000-22934 A | 1/2000 |
| JP | 2005-210651 | 8/2005 |
| JP | 2005-244861 A | 9/2005 |
| JP | 2006-059202 A | 3/2006 |
| JP | 2007-148784 A | 6/2007 |
| JP | 2008-061260 | 3/2008 |
| JP | 2009-104323 | 5/2009 |
| JP | 2010-81479 | 4/2010 |
| JP | 2010-130628 | 6/2010 |
| JP | 2012-053190 | 3/2012 |

OTHER PUBLICATIONS

Chinese Office Action dated May 4, 2016, for CN201310411332.4 (English translation provided).

Office Action issued in Japanese Application No. 2015-186489 dated Aug. 2, 2016.

Office Action for Japanese Patent Application No. 2017-055341 dated Jun. 26, 2018.

* cited by examiner

| CONVERTED COORDINATE VALUE | | COORDINATE VALUE BEFORE CONVERSION | |
|---|---|---|---|
| θ (pix) | φ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

FIG.11A
PATTERN IMAGE OF 1ST CORRECTED IMAGE
FOR POSITION DETECTION
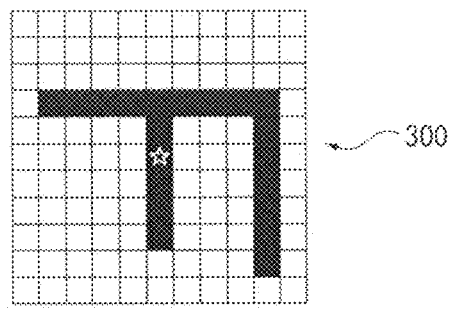
FIG.11B
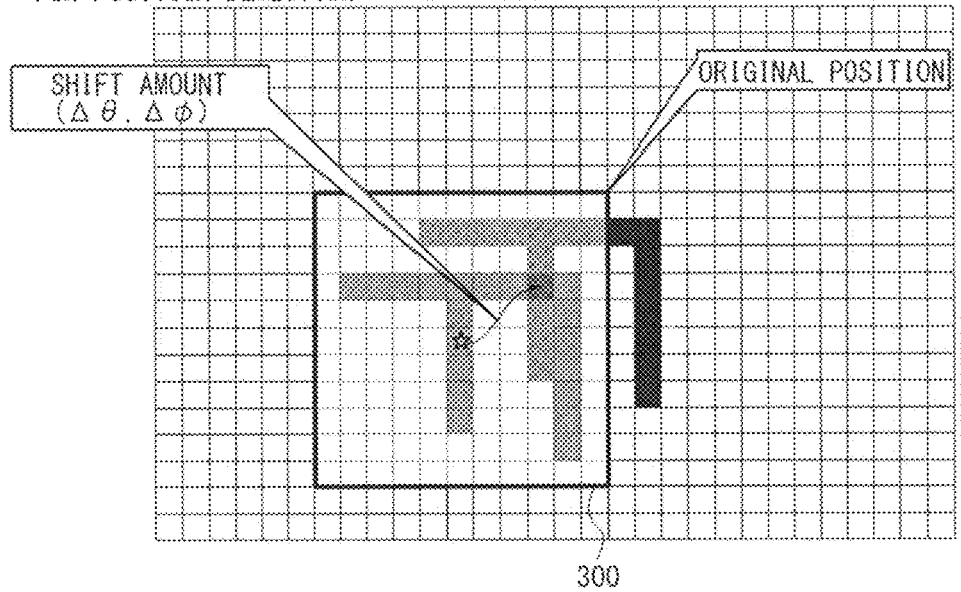
FIG.12
| CONVERTED COORDINATE VALUE | | CONNECTING POSITION (SHIFT AMOUNT) | |
|---|---|---|---|
| $\theta$ (pix) | $\phi$ (pix) | $\Delta\theta$ (pix) | $\Delta\phi$ (pix) |
| 0 | 0 | | |
| 1 | 0 | | |
| ⋮ | ⋮ | ⋮ | ⋮ |
| 3598 | 1799 | | |
| 3599 | 1799 | | |

IMAGE PROCESSOR, IMAGE PROCESSING METHOD AND PROGRAM, AND IMAGING SYSTEM

CROSS REFERENCE TO RELATED APPLICATION

The present application is based on and claims priority from Japanese Patent Application No. 2012-199320, filed on Sep. 11, 2012 and No. 2013-124397, filed on Jun. 13, 2013, the disclosure of which is hereby incorporated by reference in its entirety.

BACKGROUND OF THE INVENTION

Field of the Invention

The present invention relates to an image processor, image processing method and program, and an imaging system for connecting input images formed by a lens system.

Description of the Related Art

There is a known omnidirectional imaging system which includes multiple wide-angle lenses such as fisheye lens or super wide-angle lens to capture an image in omnidirections at once. It is configured to project images from the lenses onto a sensor surface and combine the images through image processing to thereby generate an omnidirectional image. For example, by use of two wide-angle lenses with angle of view of over 180 degrees, omnidirectional images can be generated.

In the image processing a partial image captured by each lens system is subjected to distortion correction and projection conversion on the basis of a certain projection model with a distortion from an ideal model taken into account. Then, the partial images are connected on the basis of an overlapping portion of the partial images to form a single omnidirectional image. The positions at which subject images overlap in the overlapping portion are detected by pattern matching or the like.

However, partial images with a large amount of distortion, for example, ones captured with the fisheye lens, contain connecting areas having different kinds or amounts of distortion even when the same subject is captured. Accordingly, it is very difficult to accurately detect the overlapping positions of the images by pattern matching. Thus, partial images cannot be connected properly and a high-quality omnidirectional image cannot be generated accordingly.

There are various known techniques to combine partial images captured with multiple cameras. For example, Japanese Patent Application Publication No. 2010-130628 (Reference 1) discloses an imaging device comprising partial cameras having an overlapping photographic area and capturing a partial area of a photographic area of a subject and a reference camera having a photographic area including a part of an image captured by each partial camera. It corrects a distortion of a captured image of each camera using a camera parameter, detects an image area in which the corrected images of the partial cameras and the corrected image of the reference camera coincide with each other, calculates a relative position, and connects the images.

Further, Japanese Patent Application Publication No. 2009-104323 (Reference 2) discloses a camera system which uses multiple cameras arranged to have overlapping photographic areas and generates a high-precision mapping table not to cause a displacement in connecting points according to an actually captured image without the estimation of set positions of the cameras. Japanese Patent Application No. 2010-81479 (Reference 3) discloses an image processor which converts only X-coordinates of a fisheye image of a vehicle on the road captured with an in-vehicle camera, to generate a virtual view image with no vanishing points. It intends to convert fisheye images into images such that parking lot lines on a road surface appear to be approximately linear and parallel.

However, Reference 1 relates to connecting images represented in plane coordinates and cannot detect connecting positions accurately when applied to an imaging device using a lens with a large distortion such as a fisheye lens. Also, Reference 2 teaches the generation of mapping tables by use of an existing target board but cannot align the positions of images accurately. Reference 3 teaches the correction of fisheye images but does not concern connecting a plurality of images.

SUMMARY OF THE INVENTION

The present invention aims to provide an image processor, image processing method and program, and an imaging system which can accurately connect captured images even with use of a lens system having a large amount of distortion.

According to one aspect of the present invention, an image processor comprises a first converter to convert input images into images in a different coordinate system from that of the input images according to first conversion data based on a projection model, a position detector to detect a connecting position of the images converted by the converter, a corrector to correct the first conversion data on the basis of a result of the detection by the position detector, and a data generator to generate second conversion data for image synthesis from the conversion data corrected by the corrector on the basis of coordinate conversion, the second conversion data defining the conversion of the input images.

BRIEF DESCRIPTION OF THE DRAWINGS

Features, embodiments, and advantages of the present invention will become apparent from the following detailed description with reference to the accompanying drawings:

FIGS. 11A, 11B show the connecting position detection in the first embodiment;

FIG. 12 shows the data structure of data generated by the position detector;

DETAILED DESCRIPTION OF PREFERRED EMBODIMENTS

Hereinafter, embodiments of an image processor and an imaging system will be described in detail with reference to the accompanying drawings. Wherever possible, the same reference numbers will be used throughout the drawings to refer to the same or like parts.

Figure 1:
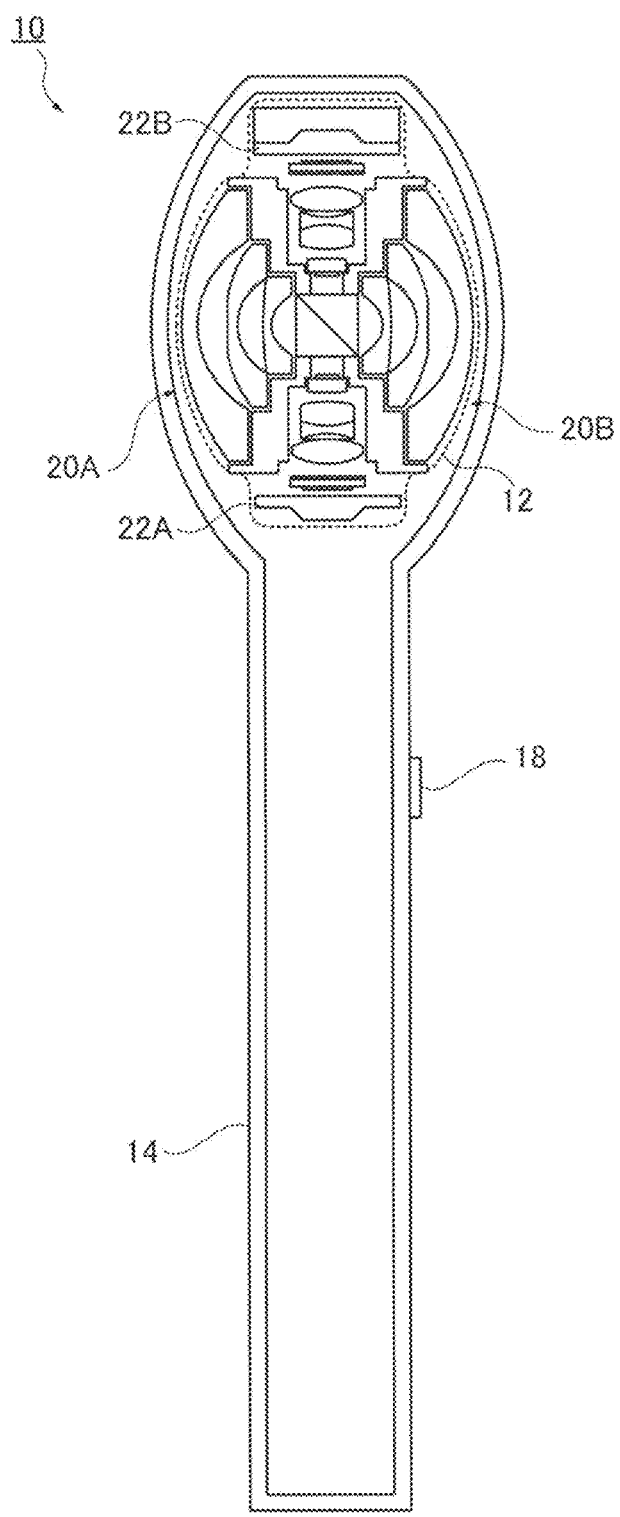
FIG. 1 is a cross section view of an omnidirectional imaging system according to a first embodiment of the present invention.
Figure 2:
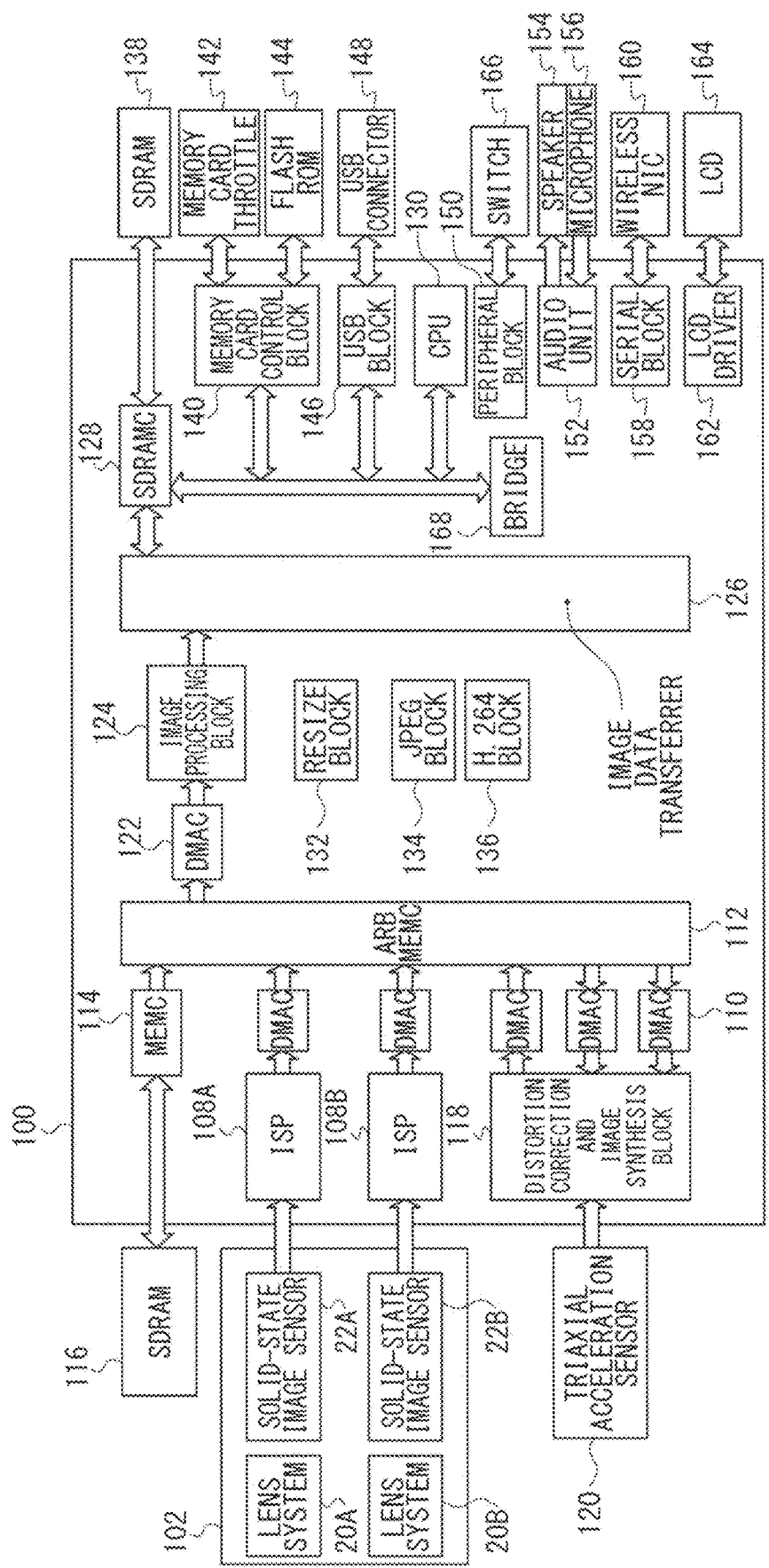
FIG. 2 shows the hardware configuration of the omnidirectional imaging system in FIG. 1.
Figure 3:
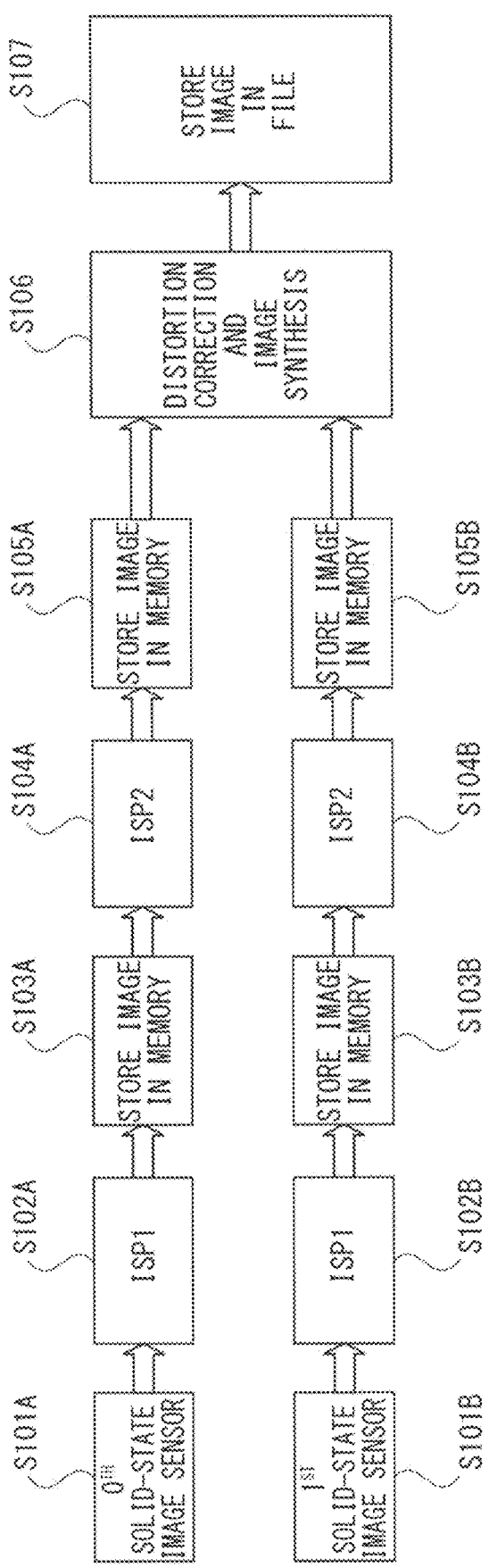
FIG. 3 shows a flow of the entire image processing of the omnidirectional imaging system in FIG. 1.

Referring to FIGS. 1 to 3, the overall configuration of an omnidirectional imaging system 10 is described. The omnidirectional imaging system 10 comprises two fisheye lenses to capture two partial images and an image processing function to perform distortion correction and projection conversion to the partial images, connect the partial images and generate an omnidirectional image, by way of example. FIG. 1 is a cross section view of the omnidirectional imaging system 10 (hereinafter, simply imaging system). It comprises a camera unit 12, a housing 14 accommodating the camera unit 12 and elements as controller, batteries, and a shutter button 18 provided on the housing 14. The camera unit 12 in FIG. 1 comprises two lens systems 20A, 20B and two solid-state image sensors 22A, 22B as CCD (charge coupled device) sensor or CMOS (complementary metal oxide semiconductor). Herein, each of the pairs of the lens systems 20 and solid-state image sensors 22 are referred to as imaging unit. The lens systems 20A, 20B are each comprised of 6 groups of 7 lenses as a fisheye lens, for instance. In the present embodiment the fisheye lens has total angle of view of 180 degrees (360 degrees/n, n=2) or more, preferably 185 degrees or more, more preferably 190 degrees or more.

The optical elements as lenses, prisms, filters, aperture stops of the lens systems 20A, 20B are positioned relative to the solid-state image sensors 22A, 22B so that the optical axes of the optical elements are orthogonal to the centers of the light receiving areas of the corresponding solid-state image sensors 22 as well as the light receiving areas become the imaging planes of the corresponding fisheye lenses. The solid-state image sensors 22 are area image sensors on which photodiodes are two-dimensionally arranged, to convert light gathered by the lens systems 20 to image signals.

In the present embodiment the lens systems 20A, 20B are the same and disposed opposite to each other so that their optical axes coincide. The solid-state image sensors 22A, 22B convert light distribution to image signals and output them to a not-shown image processor on the controller. The image processor combines partial images from the solid-state image sensors 22A, 22B to generate an image with solid angle of $4\pi$ in radian or an omnidirectional image. The omnidirectional image is captured in all the directions which can be seen from a shooting point. Instead of the omnidirectional image, a panorama image which is captured in a 360-degree range only on a horizontal plane can be generated.

To form an omnidirectional image with use of the fisheye lenses with total angle of view of more than 180 degrees, an overlapping portion of the captured images by the imaging units is used as reference data representing the same image and for connecting images. Generated omnidirectional images are output to, for instance, a display provided in or connected to the camera unit 12, a printer or an external storage medium such as SD Card®, Compact Flash®.

FIG. 2 shows the structure of hardware of the imaging system 10 according to the present embodiment. The imaging system 10 comprises a digital still camera processor 100 (hereinafter, simply processor), a lens barrel unit 102, and various elements connected with the processor 100. The lens barrel unit 102 includes the two pairs of lens systems 20A, 20B and solid-state image sensors 22A, 22B. The solid-state image sensors 22A, 22B are controlled by a command from a CPU 130 of the processor 100.

The processor 100 comprises ISPs (image signal processors) 108A, 108B, a DMAC (direct memory access controller) 110, an arbiter (ARBMEMC) 112 for memory access, a MEMC (memory controller) 114 for memory access, and a distortion correction and image synthesis block 118. The ISPs 108A, 108B set white balance and gamma balance of image data signal-processed by the solid-state image sensors 22A, 22B. The MEMC 114 is connected to an SDRAM 116 which temporarily stores data used in the processing of the ISP 108A, 108B and distortion correction and image synthesis block 118. The distortion correction and image synthesis block 118 performs distortion correction and vertical correction on the two partial images from the two imaging units on the basis of information from a triaxial acceleration sensor 120 and synthesizes them.

The processor 100 further comprises a DMAC 122, an image processing block 124, a CPU 130, an image data transferrer 126, an SDRAMC 128, a memory card control block 140, a USB block 146, a peripheral block 150, an audio unit 152, a serial block 158, an LCD (Liquid Crystal Display) driver 162, and a bridge 168.

The CPU 130 controls the operations of the elements of the imaging system 10. The image processing block 124 performs various kinds of image processing on image data together with a resize block 132, a JPEG block 134, an H.264 block 136. The resize block 132 enlarges or shrinks the size of image data by interpolation. The JPEG block 134 is a codec block to compress and decompress image data in JPEG. The H.264 block 136 is a codec block to compress and decompress video data in H.264. The image data transferrer 126 transfers the images processed by the image processing block 124. The SDRAMC 128 controls the SDRAM 138 connected to the processor 100 and temporarily storing image data during image processing by the processor 100.

The memory card control block 140 controls data read and write to a memory card and a flash ROM 144 inserted to a memory card throttle 142 in which a memory card is detachably inserted. The USB block 146 controls USB communication with an external device such as personal computer connected via a USB connector 148. The peripheral block 150 is connected to a power switch 166. The audio unit 152 is connected to a microphone 156 for receiving an audio signal from a user and a speaker 154 for outputting the audio signal, to control audio input and output. The serial block 158 controls serial communication with the external device and is connected to a wireless NIC (network interface card) 160. The LCD driver 162 is a drive circuit for the LCD 164 and converts the image data to signals for displaying various kinds of information on an LCD 164.

The flash ROM 144 contains a control program written in readable codes by the CPU 130 and various kinds of parameters. Upon power-on of the power switch 166, the control program is loaded onto a main memory. The CPU 130 controls the operations of the units and elements of the image processor in compliance with the control program on the main memory, and temporarily stores necessary control data in the SDRAM 138 and a not-shown local SRAM.

FIG. 3 shows a flow of the entire image processing of the imaging system 10 according to the present embodiment. In steps S101A, 101B the solid-state image sensors 22A, 22B capture images. In steps S102A, 102B the ISPs 108 perform optical black correction, defective pixel correction, linear correction, shading, and area division and averaging onto Bayer RAW images and in steps S103A, 103B the images are stored in the memory. In steps S104A, 104B the ISPs 108 further perform white balance, gamma correction, Bayer interpolation, YUV conversion, edge enhancement and color correction to the images, and the images are stored in the memory in steps S105A, 105B.

Upon completion of the above processing to the images captured on the solid-state image sensors 22A, 22B, in step S106 each partial image is subjected to distortion correction and image synthesis. In step S107 a generated omnidirectional image is added with a tag properly and stored in a file in the internal memory or an external storage. Alternatively, inclination correction can be additionally performed on the basis of the information from the triaxial acceleration sensor 120 or a stored image file can be subjected to compression when appropriate.

By use of a fisheye lens with a wide angle of view, an overlapping portion of partial images as a reference for image connection includes a large amount of distortion. Due to the distortion inherent to the fisheye lens, partial images may not be accurately connected in the distortion correction and image synthesis in step S106. In view of this, the imaging system 10 uses different parameters for image synthesis and connecting position detection before image synthesis, for the purpose of properly synthesizing partial images captured by the fisheye lenses with a larger amount of distortion than a general lens.

Figure 4:
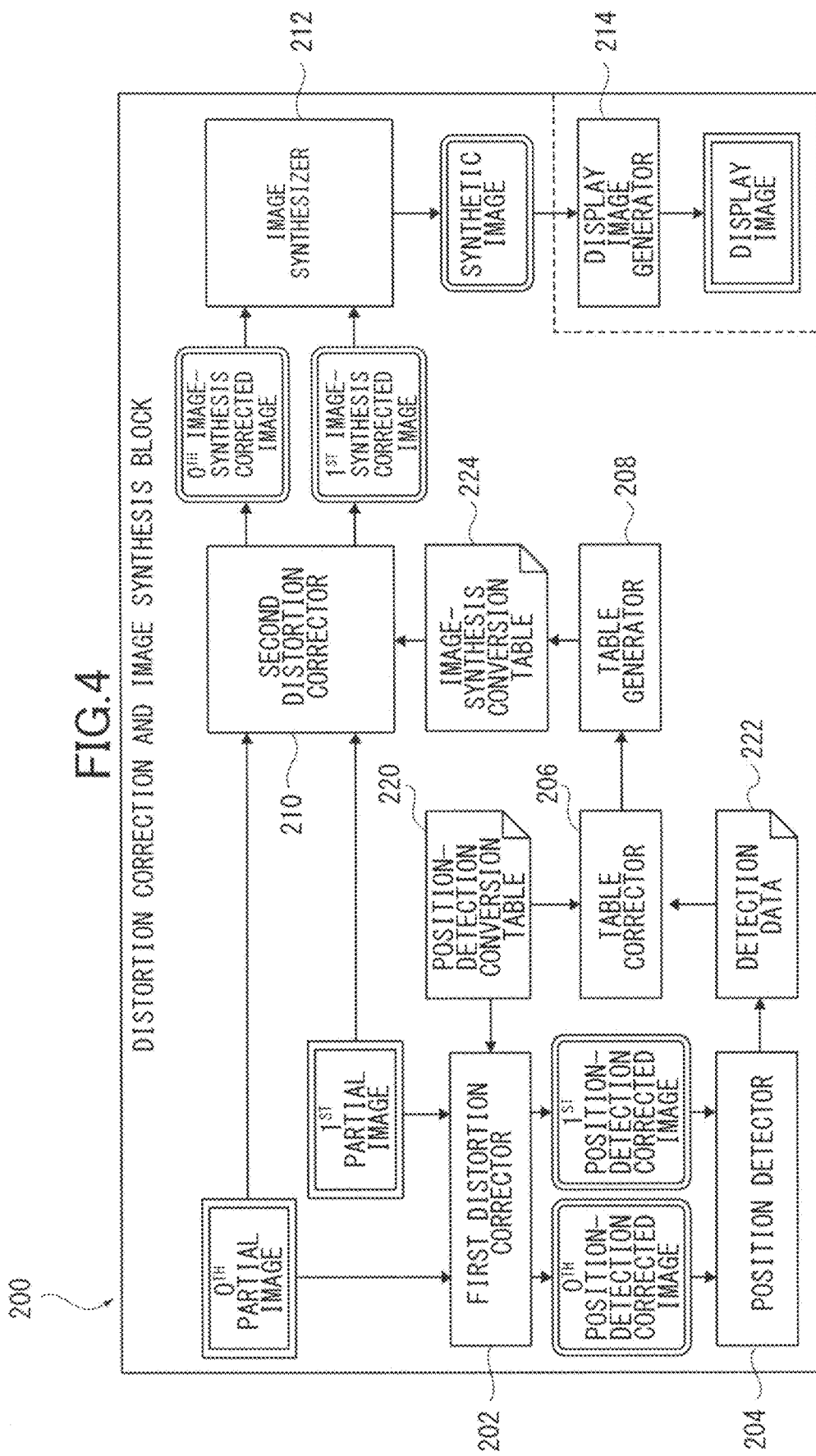
FIG. 4 is a function block diagram for omnidirectional image synthesis in the omnidirectional imaging system.

In the following the omnidirectional image synthesis function of the imaging system 10 will be described in detail, referring to FIG. 4 to FIG. 14. FIG. 4 shows a function block 200 for the omnidirectional image synthesis of the imaging system 10. The distortion correction and image synthesis block 118 in FIG. 4 comprises a distortion corrector for position detection 202, a position detector 204, a table corrector 206, a table generator 208, a distortion corrector for image synthesis 210, and an image synthesizer 212. For the sake of simplicity, the distortion corrector for position detection and the distortion corrector for image synthesis will be referred to as first and second distortion correctors, respectively.

Two partial images are input from the solid-state image sensors 22A, 22B to the distortion correction and image synthesis block 118 via the ISPs 108A, 108B. Herein, the solid-state image sensors 22A, 22B are referred to as $0^{th}$ and $1^{st}$ image sensors and a partial image from the solid-state image sensors 22A is referred to as 0th partial image while that from the solid-state image sensor 22B is referred to as $1^{st}$ partial image. The distortion correction and image synthesis block 118 is provided with a conversion table for position detection 220 which is prepared by a manufacturer in compliance with a certain projection model on the basis of design data about the lens systems.

The first distortion corrector 202 corrects distortion of the 0th and $1^{st}$ partial images before connecting position detection, referring to the conversion table 220 to generate $0^{th}$ and $1^{st}$ corrected images. The $0^{th}$ and $1^{st}$ partial images are captured on the two-dimensional solid-state image sensors and image data represented in a plane coordinate system (x, y). Meanwhile, the $0^{th}$ and $1^{st}$ corrected images are image data in a different coordinate system from the partial images, more specifically, they are image data in an omnidirectional image format represented in a spherical coordinate system which is a polar coordinate system having a radius of 1 and two arguments θ, φ.

Figure 6A:
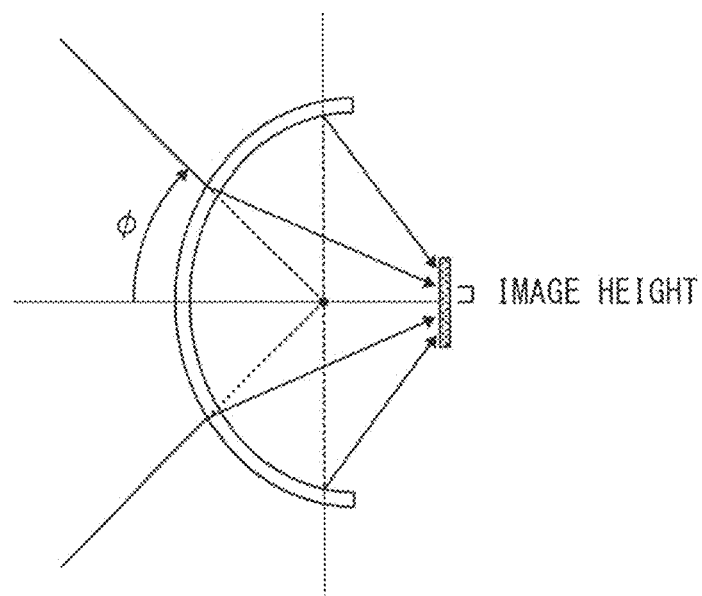
FIGS. 6A, 6B show the projection of an omnidirectional imaging system using a fisheye lens.
Figure 6B:
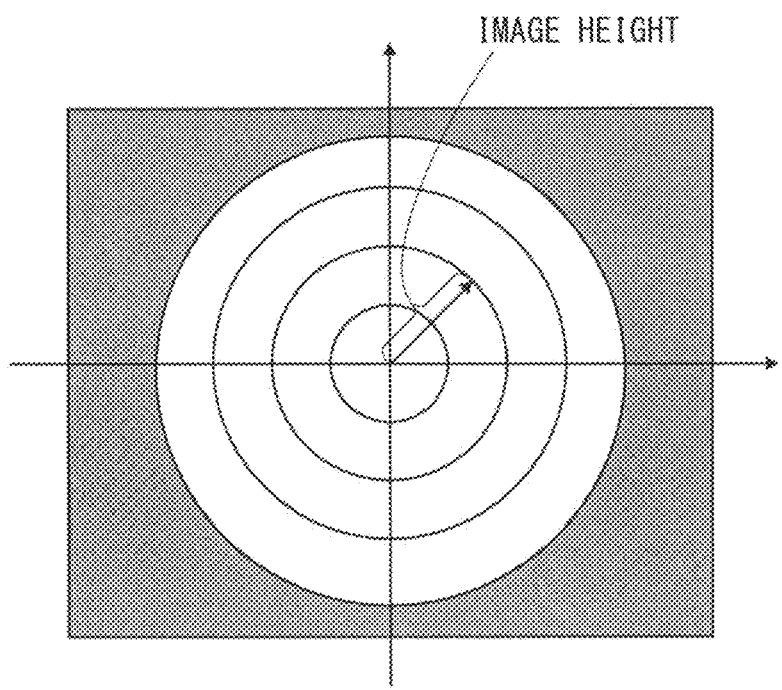

FIGS. 6A, 6B show the projection of the imaging system incorporating a fisheye lens. In the present embodiment a single fisheye lens captures an image in directions in about a hemisphere from a photographic point, and generates an image with image height h corresponding to an incidence angle φ relative to the optical axis. The relation between the image height h and incidence angle φ is determined by a projection function according to a certain projection model. The projection function differs depending on the property of a fisheye lens and that of an equisolid angle projection type fisheye lens is expressed by the following equation (1):

$$h=f*\varphi$$

where f is focal length.

The projection model exemplifies a perspective projection (h=f*tan φ), a stereo projection (h=2f*tan(φ/2)), an equisolid angle projection (h=2f*sin (φ/2)), an orthographic projection (h=f*sin φ). In any of the projection models the image height h is determined according to the incidence angle φ and focal length f. In the present embodiment a circular fisheye lens having an image circle diameter smaller than an image diagonal line is used and an obtained partial image is a planar image including the entire image circle in which about the hemisphere of a photographic area is projected, as shown in FIG. 6B.

Figure 7A:
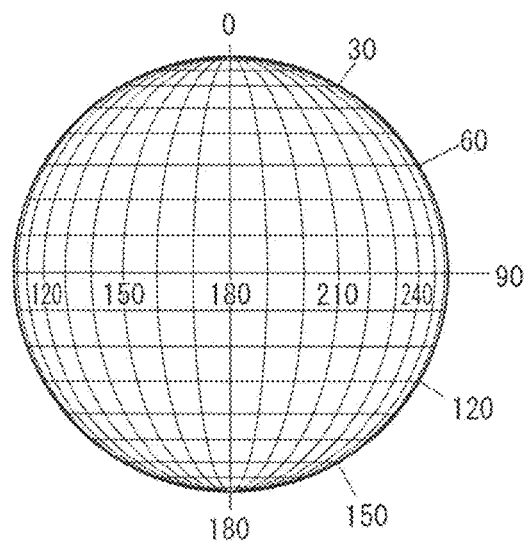
FIGS. 7A, 7B show the data structure of image data in an omnidirectional image format according to the first embodiment.
Figure 7B:
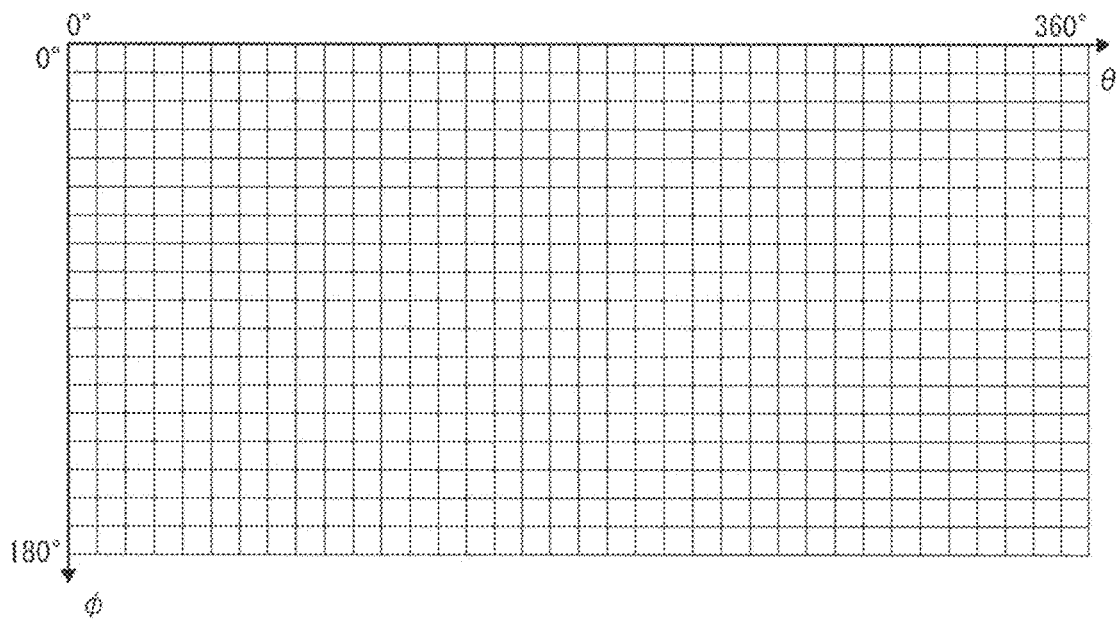

FIGS. 7A, 7B show the data structure of image data in omnidirectional image format according to the present embodiment. As shown in the drawings, the image data in omnidirectional image format is represented by the arrays of pixel values at coordinates of vertical angle φ corresponding to an angle relative to a certain axis and horizontal angle θ corresponding to a rotational angle around the certain axis. The horizontal angle θ is from 0 to 360 degrees or −180 to +180 degrees while the vertical angle φ is from 0 to 180 degrees or −90 to +90 degrees. Each coordinate value (θ, φ) is associated with each point on the spherical surface representing omnidirections from a photographic point and the omnidirections are mapped on an omnidirectional image. The plane coordinates of an image captured by a fisheye lens can be related to the spherical coordinates in omnidirectional image format by the projection function described in FIGS. 6A, 6B.

Figures 8A, 8B:
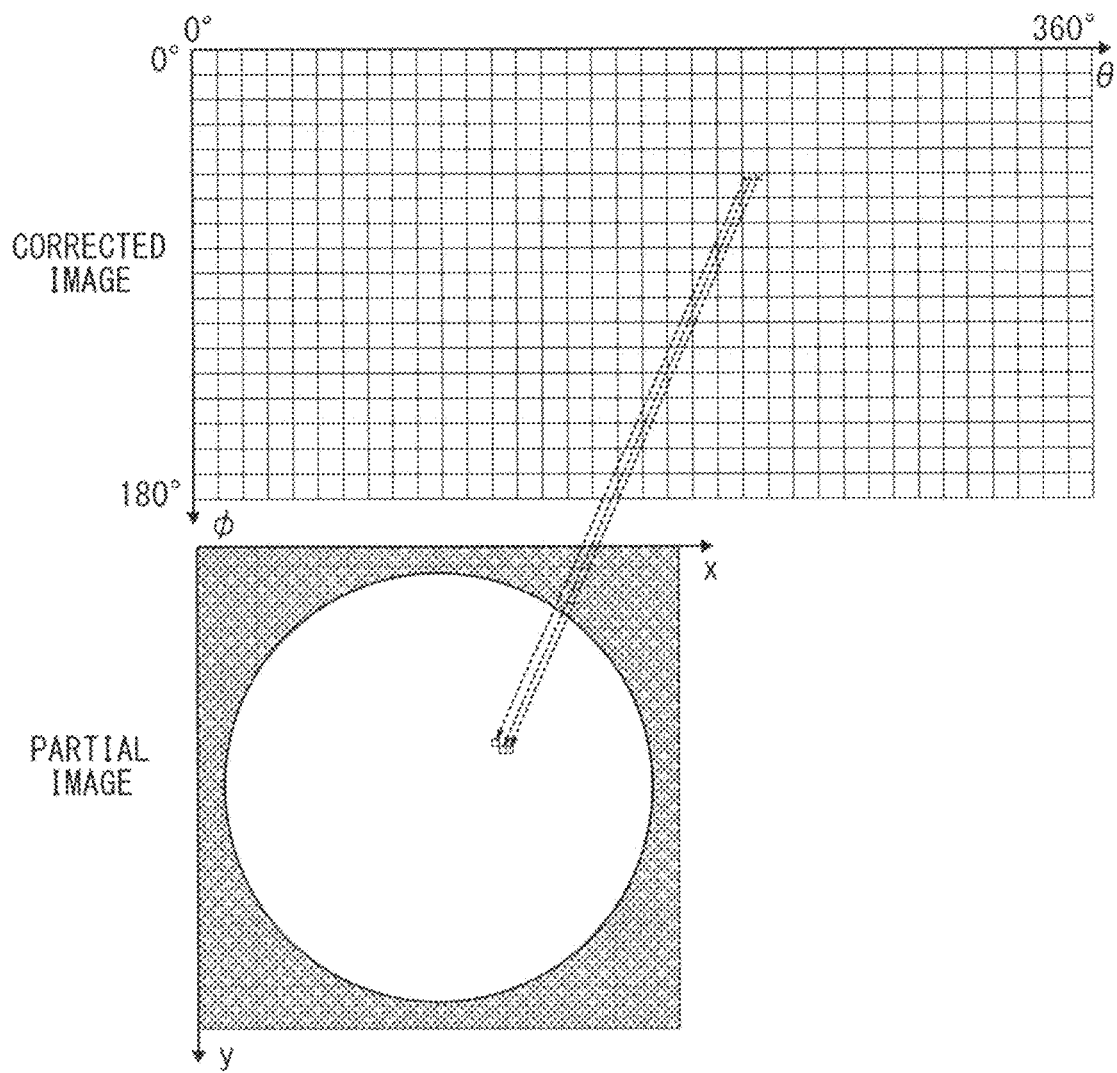
FIGS. 8A, 8B show conversion data to which a first distortion corrector for position detection and a second distortion corrector for image synthesis refer.

FIGS. 8A, 8B show conversion data to which the first and second distortion correctors 202, 210 refer. The conversion tables 220, 224 define projection from a partial image represented in a plane coordinate system to an image represented in a spherical coordinate system. The conversion tables 220, 224 contain, for each fisheye lens, for all the coordinate values (θ, φ) (θ=0 to 360 degrees, φ=0 to 180 degrees), information to associate the coordinate values of a corrected image with the coordinate values (x, y) of a partial image before correction to be mapped on the coordinate values (θ, φ). In FIGS. 8A, 8B, for instance, the angle of one pixel is a ¹⁄₁₀ degree in both φ and θ directions. The conversion tables 220, 224 contain information indicating 3,600*1,800 relations for each fisheye lens.

The data in the conversion table for position detection 220 are calculated in advance by a manufacturer or else on the basis of lens design data and the lens projection shown in FIGS. 6A, 6B with distortion from an ideal lens model due to radial distortion or eccentric distortion corrected. In contrast the conversion table for image synthesis 224 is generated from the conversion table 220 by a certain conversion. Herein, the conversion data is a table indicating a relation between the two coordinate values. Alternatively, it can be coefficient data of one or more functions to define projection from a partial image (x, y) expressed in a plane coordinate system to an image (θ, φ) expressed in a spherical coordinate system.

Referring back to FIG. 4, the first distortion corrector 202 converts $0^{th}$ and $1^{st}$ partial images into $0^{th}$ and $1^{st}$ corrected images with reference to the conversion table 220. Specifically, it finds, for all the coordinate values (θ, φ) of the corrected images, the coordinate values (x, y) of a partial image before the conversion and the pixel values thereof at the found coordinates, referring to the conversion table 220. Thereby, a corrected image is generated.

Figure 9:
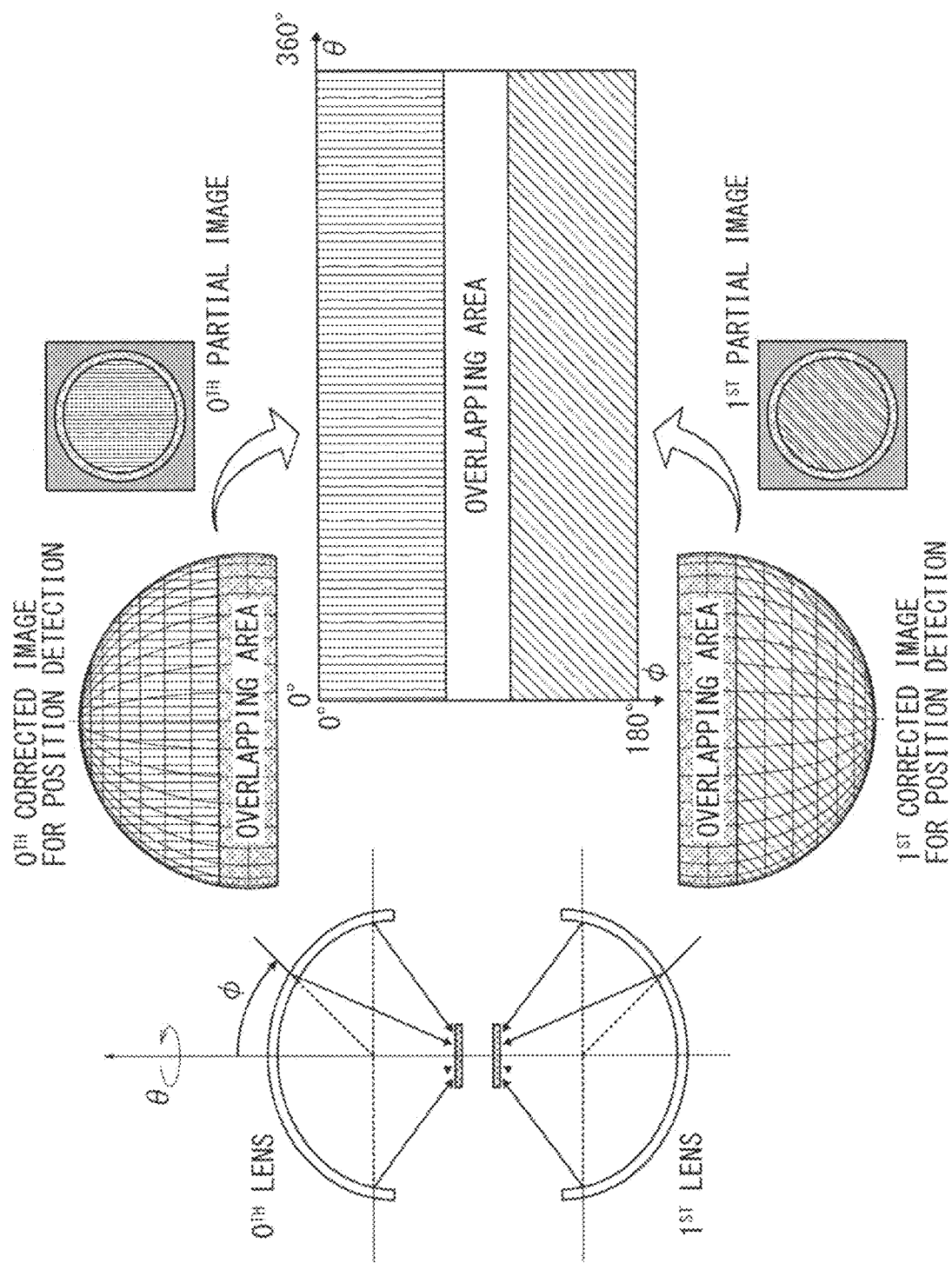
FIG. 9 shows mapping of two partial images captured by two fisheye lenses in a spherical coordinate system for position detection.

FIG. 9 shows the mapping of two partial images, $0^{th}$ and $1^{st}$, captured with the two fisheye lenses, $0^{th}$ and $1^{st}$, into data in a spherical coordinate system. Processed by the first distortion corrector 202, the $0^{th}$ and $1^{st}$ partial images are laid out on the omnidirectional image format, as shown in FIG. 9. Generally, the $0^{th}$ partial image by the $0^{th}$ fisheye lens is mapped in the upper hemisphere while the $1^{st}$ partial image by the $1^{st}$ fisheye lens is mapped in the lower hemisphere. The $0^{th}$ and $1^{st}$ corrected images in the omnidirectional image format are spread beyond the respective hemispheres since the total angle of view of the fisheye lenses exceeds 180 degrees. As a result, when the two corrected images are superimposed, an overlapping photographic area therebetween will occur.

After the distortion correction by the first distortion corrector 202, the position detector 204 detects a connecting position of the overlapping areas. However, in the spherical coordinate system the closer the vertical angle φ to the pole, 0 or 180 degrees, the larger a difference between the number of pixels along the horizontal angle θ and an actual distance. At the vertical angle being 0 or 180 degrees, the distance in θ-direction becomes zero and all the pixels in this direction represent the same direction. Also, the amount of variation in the distance in θ-direction increases as the vertical angle φ approaches 0 or 180 degrees, and it is smallest at the vertical angle φ being 90 degrees. It signifies a change amount of distortion when an image is shifted in θ-direction. Thus, the closer to 0 or 180 degrees the vertical angle φ is, the lower the accuracy of connecting position detection is.

In view of the above, the conversion table 220 is created so that the optical axes of the two lens systems are projected on the two poles (φ=0, 180 degrees) of the spherical surface as well as an overlapping area between the images is projected near the equatorial line (φ=90 degrees±((total angle of view−180 degrees)/2)) on the spherical surface, as shown in FIG. 9. The axis defining the vertical and horizontal angles in the omnidirectional image format matches the optical axis of one of the images, $0^{th}$ image in this example. Thereby, a connecting position is detected around the vertical angle of 90 degrees with a small distortion when the image is shifted in θ-direction, improving the accuracy at which connecting positions are detected. Thus, it is made possible to precisely detect connecting positions of images captured by a lens system having a large distortion.

Returning to FIG. 4, the position detector 204 detects a connecting position of the $0^{th}$ and $1^{st}$ corrected images converted by the first distortion corrector 202 to generate resultant detection data 222. The table corrector 206 corrects the conversion data in the conversion table 220 on the basis of the detection data 222 and sends it to the table generator 208. The table generator 208 generates the conversion table for image synthesis 224 from the corrected conversion data by rotational coordinate conversion.

The second distortion corrector 210 corrects distortion of the $0^{th}$ and $1^{st}$ partial images before image synthesis, referring to the conversion table 224 and generates $0^{th}$ and $1^{st}$ corrected images for image synthesis. The corrected images are represented in a spherical coordinate system as the corrected images for position detection but the definition of the coordinate axis is different because of the rotational coordinate conversion. The image synthesizer 212 synthesizes the $0^{th}$ and $1^{st}$ corrected images to generate a synthetic image in omnidirectional image format. The operations of the position detector 204, table corrector 206, table generator 208, second distortion corrector 210, and image synthesizer 212 will be described in detail later.

The function block 200 in FIG. 4 can additionally include a display image generator 214. The generated synthetic image in the omnidirectional image format cannot be displayed as it is on a planar display device as a display because the closer to the vertical angle 0 and 180 degrees, the larger the distortion of an image on the display. The display image generator 214 performs image processing to the omnidirectional image for display on a planar display device. For example, it can convert a synthetic image in the omnidirectional image format in a spherical coordinate system to one in a plane coordinate system having a specific direction and a specific angle of view, so as to project an image with a certain angle of view in a specific field of view designated by a user.

Figure 5:
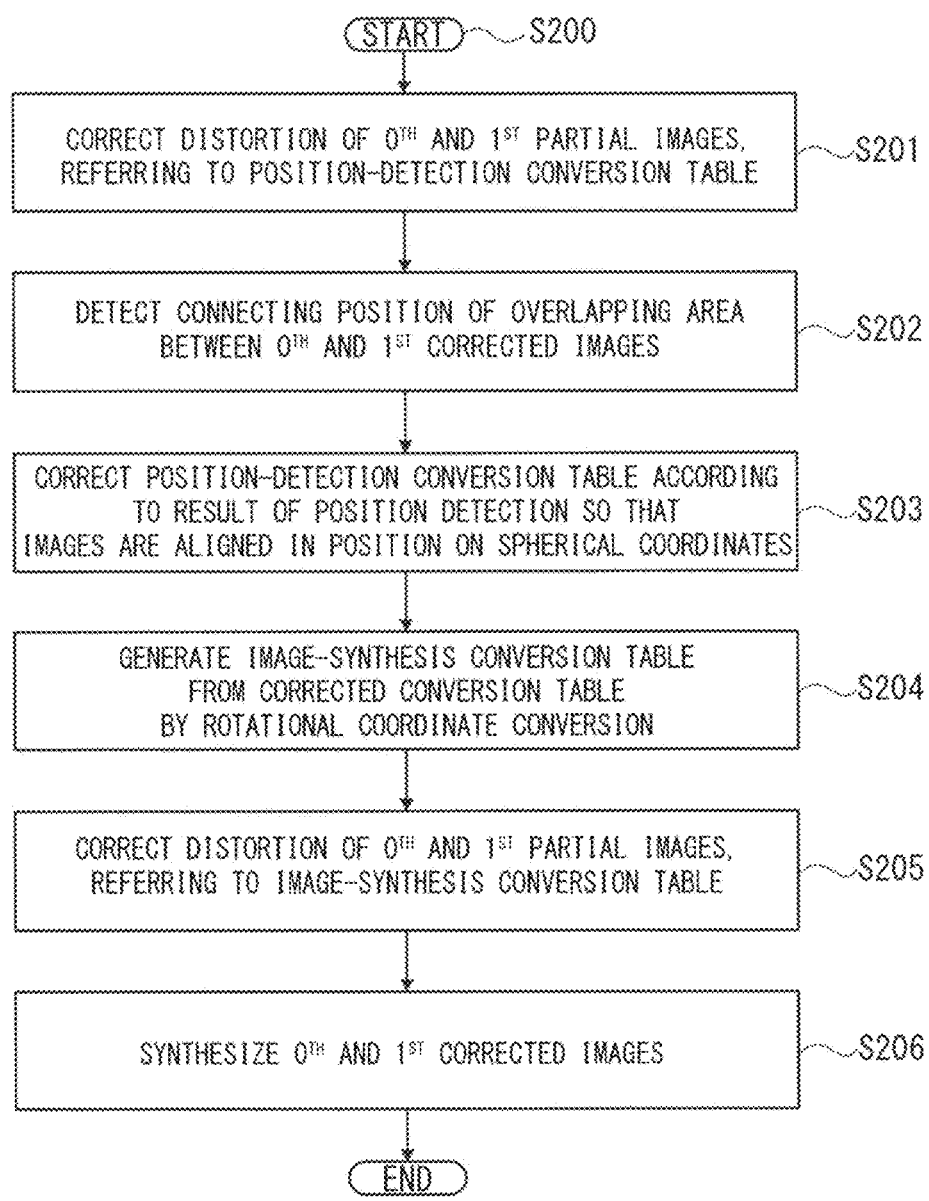
FIG. 5 is a flowchart for the image synthesis of an omnidirectional image executed by the omnidirectional imaging system.

In the following the omnidirectional image synthesis according to the present embodiment is described with reference to FIGS. 5, 10, and 13. FIG. 5 is a flowchart for the omnidirectional image synthesis executed by the imaging system 10. The operation starts when the CPU 130 issues an instruction for shooting in response to press-down of the shutter button 18, for example.

In step S201 the first distortion corrector 202 performs distortion correction on the $0^{th}$ and $1^{st}$ partial images acquired by the two solid-state image sensors 22A, 22B, referring to the conversion table 220, to acquire the $0^{th}$ and $1^{st}$ corrected images in the omnidirectional image format as shown in FIG. 9. In step S202 the position detector 204 detects a connecting position in an overlapping area between the $0^{th}$ and $1^{st}$ corrected images.

Figure 10:
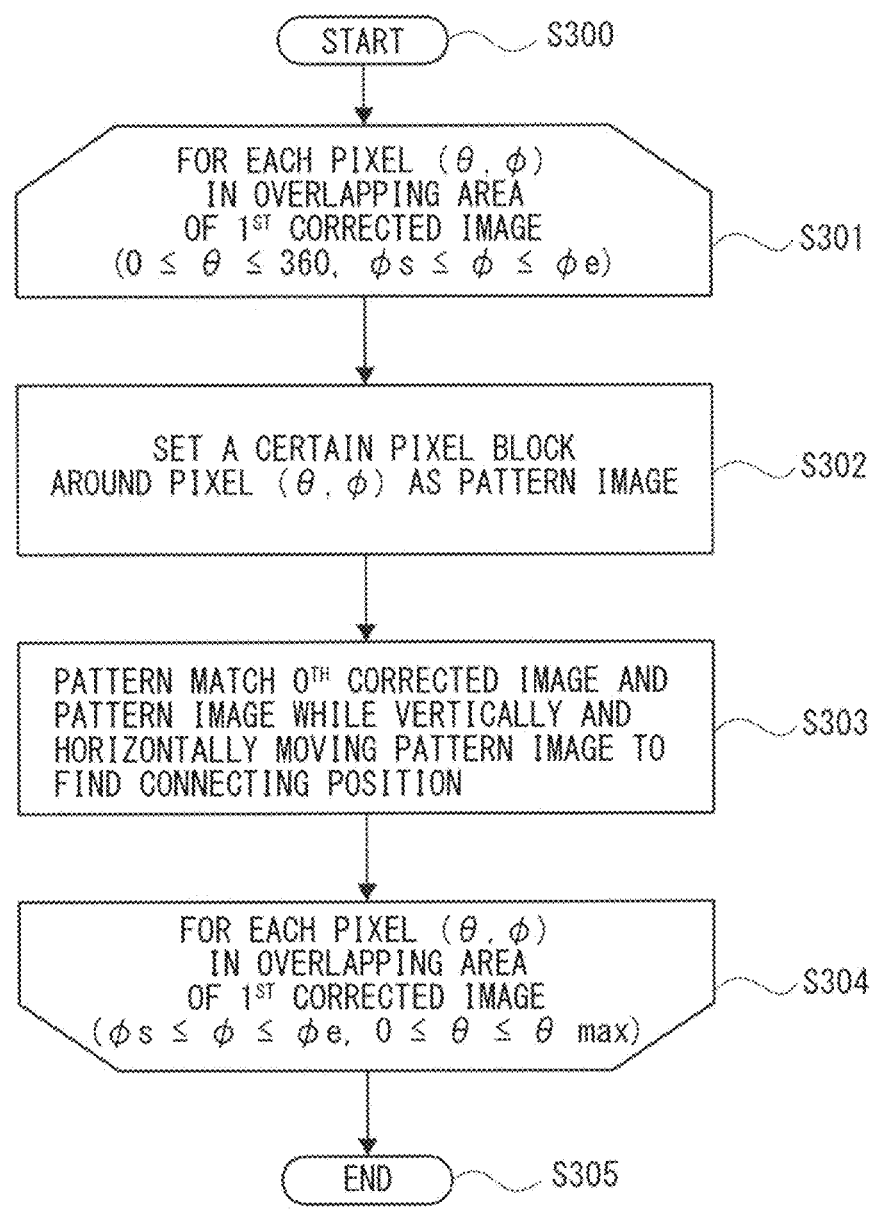
FIG. 10 is a flowchart for connecting position detection executed by the omnidirectional imaging system.

Now, the connecting position detection executed by the imaging system 10 is described, referring to FIG. 10. FIG. 11 shows connecting position detection and FIG. 12 shows the data structure of detection data generated by the position detector 204. The operation in FIG. 10 starts, following step S202 in FIG. 5. In steps S301 to S304 each pixel (θ, φ) in the overlapping area of the $1^{st}$ corrected image is subjected to the processing in steps S302 and S303. The overlapping area is defined by the horizontal angles 0 to 360 degrees and the vertical angles $φ_s$ to $φ_e$ which are start and end points of the vertical angle of the overlapping area preset in accordance with the total angle of view of the lens systems. Each pixel is set in order by pattern matching of all the pixels of the overlapping area.

In step S302 the position detector 204 sets a certain pixel block around each pixel (θ, φ) as a pattern image as shown in FIG. 11A. FIG. 11A shows, by way of example, a pixel block 300 of 11 by 11 including the pixel (θ, φ) in question indicated by the star mark. Both ends (0 and 360 degrees) of θ coordinates of the omnidirectional image format are connected. Because of this, a pattern image including the periphery of the pixel in question is set, with a next to a right-side end considered as left end and vice versa.

In step S303 the position detector 204 performs pattern matching of the 0$^{th}$ corrected image and the pattern image while moving the pattern image vertically and horizontally, to find a connecting position. Pattern matching can be template matching using correlation coefficient, city block distance, Euclidean distance, error sum of squares as similarity. In FIG. 11B the pattern image 300 of the 1$^{st}$ corrected image does not match the 0$^{th}$ corrected image at the original coordinate values but matches a 1$^{st}$ corrected image 310 at the coordinate values (θ+Δθ, φ+Δφ) shifted by a certain amount (Δθ, Δφ). That is, the 0$^{th}$ corrected image is appropriately aligned in position when the pixel value is at the coordinate (θ, φ) instead of (θ+Δθ, φ+Δφ). Accordingly, herein, a shift amount of (Δθ, Δφ) relative to the coordinate value (θ, φ) of the 0$^{th}$ corrected image for position detection is maintained.

The operation ends after all the pixels in the overlapping area are subjected to the processings in steps S302 and S303. Thereby, the detection data 222 containing, for all the coordinate values, information about the converted coordinate values (θ, φ) associated with the shift amounts (Δθ, Δφ) is acquired. If there is a coordinate value for which the shift amount cannot be found in the above connecting position detection, the shift amount can be set to zero. Alternatively, the shift amount corresponding to each coordinate value can be calculated by interpolation according to all the sets of shift amounts obtained and the projection model.

Referring back to FIG. 5, in step S203 the table corrector 206 corrects the data in the conversion table 220 on the basis of the detection data 222 so that the images are aligned in position on the spherical coordinates. As shown in FIG. 12, a shift amount is found for each coordinate value of the omnidirectional image format. In step S203, specifically, a 0$^{th}$ distortion correction table used for the 0$^{th}$ partial image is corrected so that an input coordinate value (θ, φ) in replace of (θ+Δθ, φ+Δφ) becomes associated with (x, y). Note that it is unnecessary to correct a 1$^{st}$ distortion correction table for the 1$^{st}$ partial image.

In step S204 the table generator 208 generates the conversion table 224 for image synthesis from the corrected conversion table 220 by rotational coordinate conversion.

Figure 13:
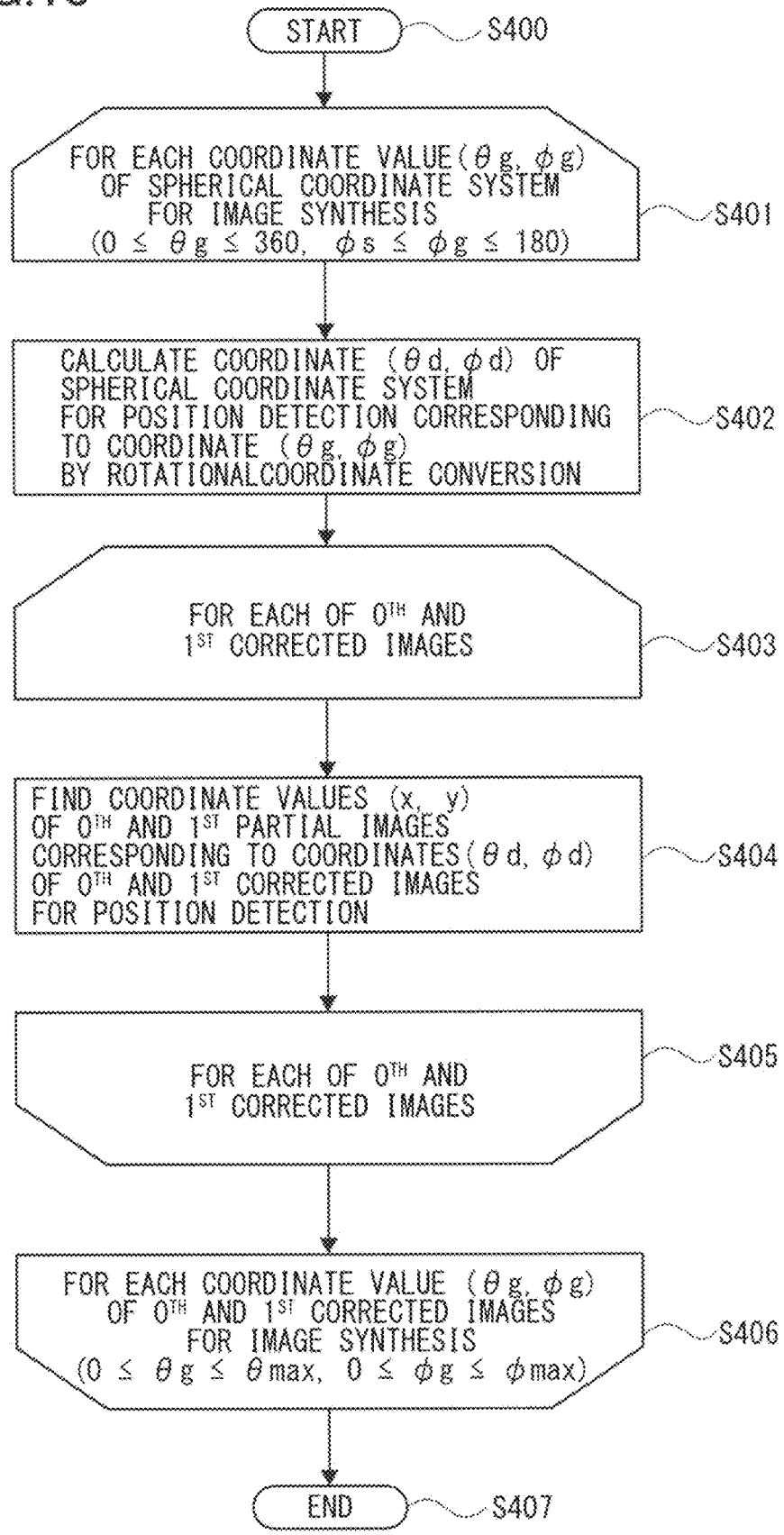
FIG. 13 is a flowchart for generating an image-synthesis conversion table by the omnidirectional imaging system according to the first embodiment.
Figure 14:
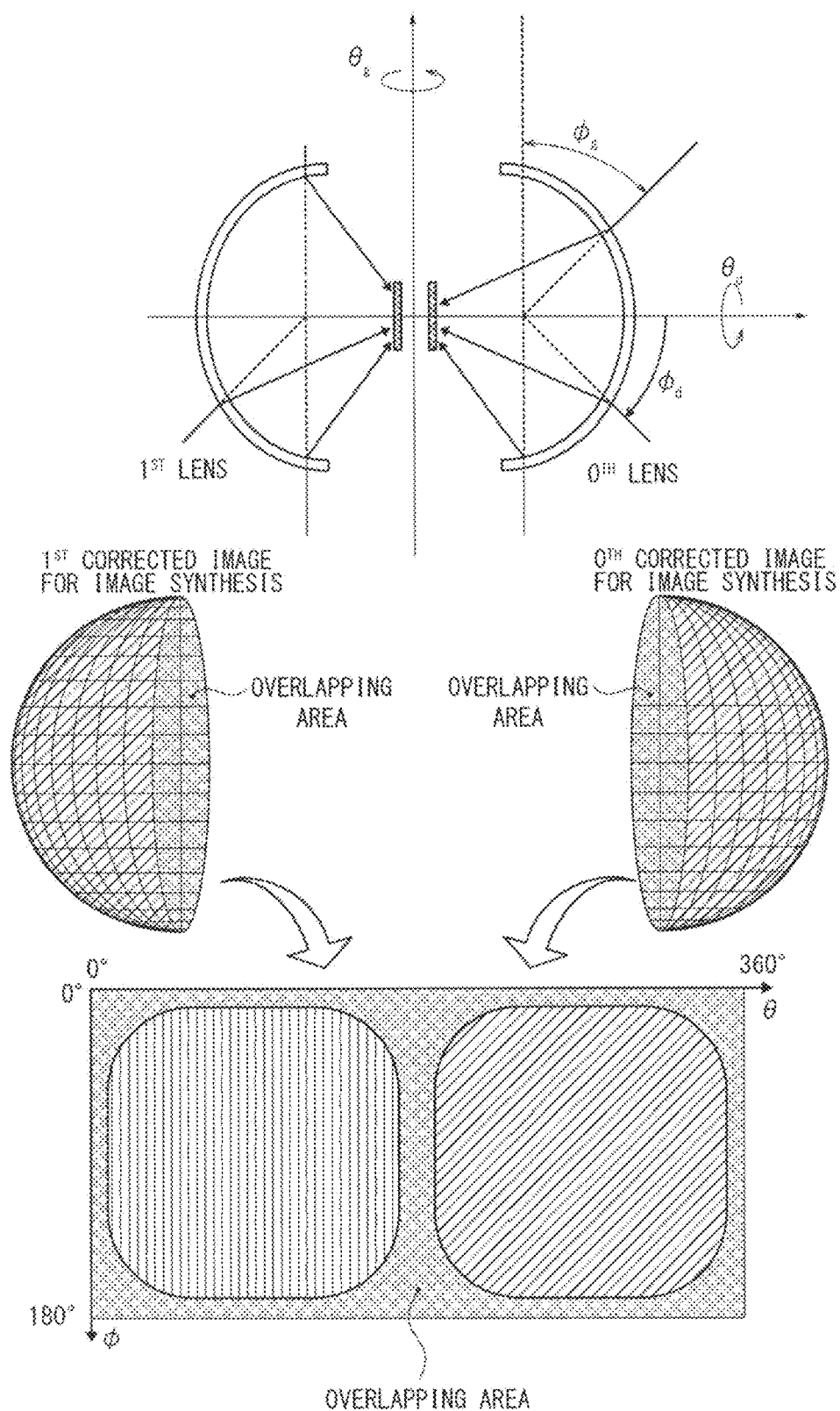
FIG. 14 shows mapping of two partial images captured by two fisheye lenses in a spherical coordinate system for image synthesis.

FIG. 13 is a flowchart for generating the conversion table for image synthesis by the imaging system 10. FIG. 14 shows the mapping of two partial images captured by two fisheye lenses into the spherical coordinate system for image synthesis. The operation in FIG. 13 starts, following in step S204 in FIG. 5. In steps S401 to S406 the table generator 208 performs processing in steps S402 to S405 for each coordinate value (θ$_g$, φ$_g$) of the spherical coordinate system for image synthesis. A range of the coordinate values are defined by the entire ranges of the horizontal angles (0 to 360 degrees) and the vertical angles (0 to 180 degrees). All the coordinate values as input values are converted and set in order.

In step S402 the table generator 208 finds a coordinate value (θ$_d$, φ$_d$) of a spherical coordinate system for connecting position detection in association with the coordinate value (θ$_g$, φ$_g$) by rotational coordinate conversion. By rotational coordinate conversion, the coordinate axes defined by the horizontal angle θ$_d$ and vertical angle φ$_d$ relative to the axis of one of the lens system in FIG. 9 is converted to one defined by the horizontal angle θ$_g$ and vertical angle φ$_g$ relative to the axis orthogonal to the optical axis in FIG. 14. The coordinate (θ$_d$, φ$_d$) corresponding to that (θ$_g$, φ$_g$) can be calculated on the basis of the rotational coordinate conversion at radius being 1.0 by the following equations, using a three-dimensional Cartesian coordinate (x$_g$, y$_g$, z$_g$) corresponding to the spherical coordinate system (θ$_g$, φ$_g$) for image synthesis and the three-dimensional Cartesian coordinate (x$_d$, y$_d$, z$_d$) corresponding to the spherical coordinate system (θ$_d$, φ$_d$) for position detection.

$$x_g = \sin(\phi_g)\cos(\theta_g)$$

$$y_g = \sin(\phi_g)\sin(\theta_g)$$

$$z_g = \cos(\phi_g)$$

$$\begin{pmatrix} x_d \\ y_d \\ z_d \end{pmatrix} = \begin{pmatrix} 1 & 0 & 0 \\ 0 & \cos\beta & \sin\beta \\ 0 & -\sin\beta & \cos\beta \end{pmatrix} \begin{pmatrix} x_g \\ y_g \\ z_g \end{pmatrix}$$

$$\phi_d = \text{Arccos}(z_d)$$

$$\theta_d = \arctan\left(\frac{y_d}{x_d}\right)$$

where β is a rotational angle about X axis of the three-dimensional Cartesian coordinate and set to 90 degrees in the present embodiment.

According to the conversion table 220 the optical axis is projected on the poles of the spherical surface and the overlapping portion between the images is projected on near the equatorial line of the spherical surface. Therefore, a vertical direction of the omnidirectional image format does not match a zenith direction of a captured scene. Meanwhile, according to the conversion table 224, by the rotational coordinate conversion the optical axis is projected on the equatorial line and a vertical direction of the omnidirectional image format matches a zenith direction of a captured scene.

In steps S403 to S405 the table generator 208 executes the processing in step S404 to each of the 0$^{th}$ and 1$^{st}$ images. In step S404 the table generator 208 finds the coordinate values (x, y) of the 0$^{th}$ and 1$^{st}$ partial images corresponding to (θ$_d$, φ$_d$), referring to the corrected conversion table 220. The conversion tables 220, 224 contain θ$_d$ and φ$_d$ together with a corresponding coordinate value (x, y) for each pixel. The coordinate values (θ$_d$, φ$_d$) calculated by the conversion are typically values less than a decimal point. The coordinate values (x, y) can be simply ones corresponding to coordinate values in the most recent conversion table of the calculated coordinate values (θ$_d$, φ$_d$). Preferably, the coordinate values (x, y) of the 0$^{th}$ and 1$^{st}$ partial images can be calculated by weighted interpolation in accordance with a distance from a calculated coordinate (θ$_d$, φ$_d$), referring to coordinate values (x, y) corresponding to a most recent coordinate value and coordinate values around the most recent coordinate value in the conversion table.

The operation ends when the calculations for both the partial images are completed in step S403 to step S405 and the calculations of all the coordinate values for the correction table are completed in steps S402 to S406. Thereby, all the items of data for the conversion table for image synthesis 224 are generated.

Returning to FIG. 5, in step S205 the second distortion corrector 210 corrects distortion of the original $0^{th}$ and $1^{st}$ partial images to obtain the $0^{th}$ and $1^{st}$ corrected images for image synthesis, referring to the conversion table 224. Thereby, the two partial images captured by the $0^{th}$ and $1^{st}$ fisheye lenses are laid out on the omnidirectional image format in FIG. 14. Generally, the $0^{th}$ partial image is mapped on the left hemisphere while the $1^{st}$ partial image is mapped on the right hemisphere.

In comparison with FIG. 9, the $0^{th}$ and $1^{st}$ partial images are mapped at different positions on the omnidirectional image format and the zenith direction of a captured scene coincides with the vertical direction φ of an image in FIG. 14. The centers of the $0^{th}$ and 1st partial images are mapped on the equatorial line with less distortion and the overlapping area between the $0^{th}$ and $1^{st}$ corrected images are mapped in the vicinity of the vertical angles 0 and 180 degrees and the horizontal angles 0 and 180 degrees in FIG. 14.

In step S206 the image synthesizer 212 generates $0^{th}$ and 1st corrected images for image synthesis. In the synthesis process the overlapping areas are blended. If there is an area with pixel values of only one of the images, the pixel values are used without a change. Thus, a single omnidirectional image is created from two partial images captured with the fisheye lenses.

As described above, the conversion table used for image synthesis differs from that used for position detection in the present embodiment. This makes it possible to prevent a decrease in the accuracy at which images are connected due to a distortion even if the images are captured with a wide-angle lens as a fisheye lens which causes a larger distortion in the image overlapping area than a general lens. Thus, the imaging system can generate high quality omnidirectional images.

Second Embodiment

The first embodiment has described the imaging system 10 as an example of the image processor and the imaging system which includes the imaging unit to capture an omnidirectional still image and the distortion correction and image synthesis block to synthesize images. Alternatively, the image processor and imaging system can be configured as an omnidirectional video imaging system. The image processor can be a camera and processor to generate an omnidirectional still or video image, upon receiving partial still or video images captured by plural imaging units, a data processor such as a personal computer, a work station, a virtual machine on a physics computer system, or a portable data terminal such as a smart phone or tablet to synthesize an omnidirectional still or video image from input partial images captured with a dedicated omnidirectional imaging unit. The omnidirectional imaging system can be one including an image processor as the above-described camera and processor, data processor, or portable data terminal and an imaging unit separately.

Figure 15:
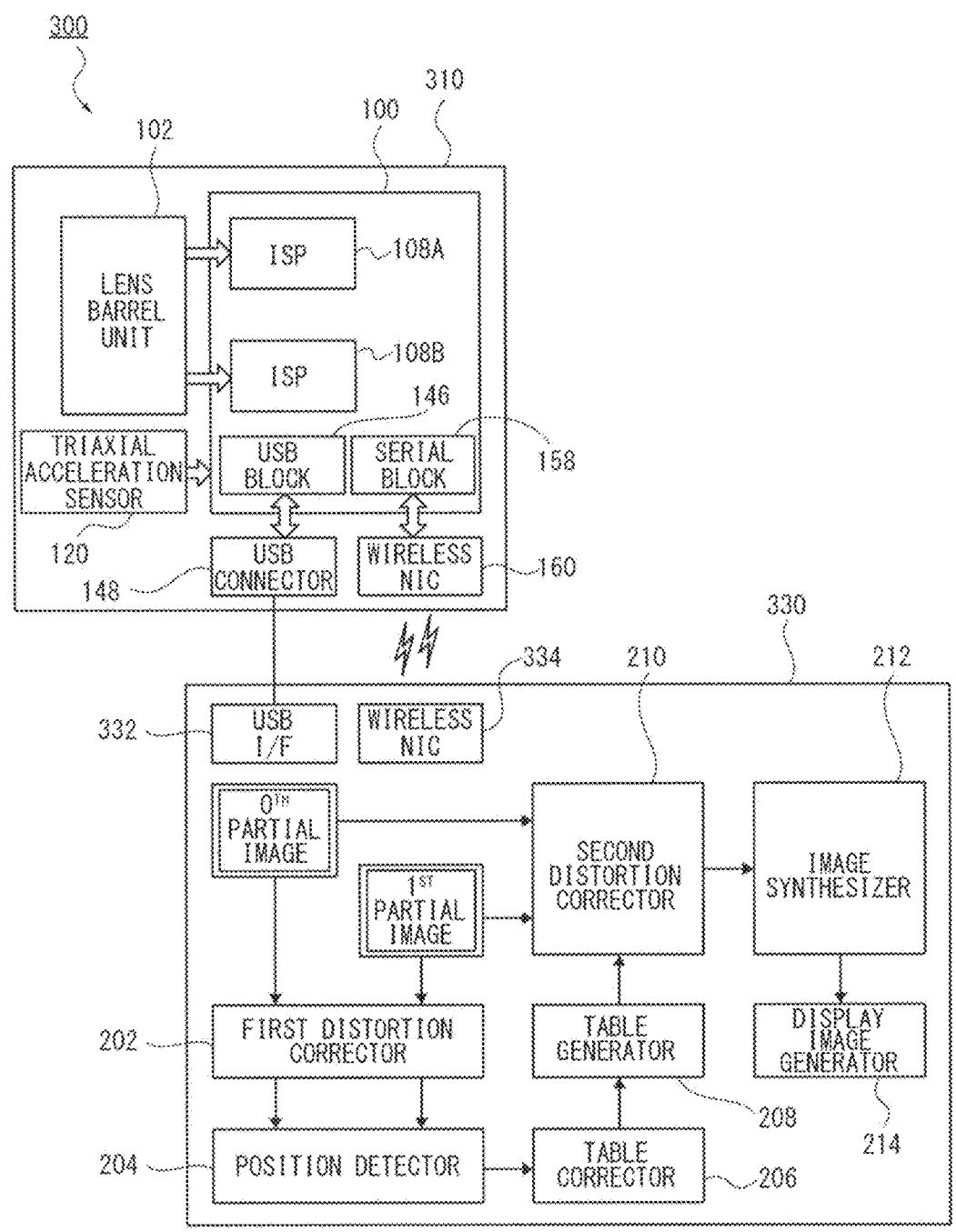
FIG. 15 schematically shows the structure of an omnidirectional imaging system according to a second embodiment.

In the following an omnidirectional imaging system comprising an omnidirectional imaging unit and an external computer unit to generate a synthetic omnidirectional image from input partial images captured with the omnidirectional imaging unit is described with reference to FIG. 15 and FIG. 16. FIG. 15 schematically shows the structure of an omnidirectional imaging system 300.

The omnidirectional imaging system 300 in FIG. 15 comprises an omnidirectional imaging unit 310 dedicated for capturing images and a computer unit 330 dedicated for image processing connected with the omnidirectional imaging unit 310. Note that FIG. 15 omits showing detailed structures. Also, the difference between the omnidirectional imaging system 300 in FIGS. 15, 16 and the imaging system 10 in FIG. 1 to FIG. 14 is in that image processing for synthesizing an omnidirectional image is executed exclusively by the computer unit 330. In the following the difference is mainly described.

The omnidirectional imaging unit 310 in FIG. 15 comprises a digital still camera and processor 100, a lens barrel unit 102, and a triaxial acceleration sensor 120 connected to the processor 100. The lens barrel unit 102 and the processor 100 are the same as those in FIG. 2.

The processor 100 comprises ISPs 108A, 108B, a USB block 146, and a serial block 158, to control USB communication with the computer unit 330 connected via a USB connector 148. The serial block 158 is connected with a wireless NIC 160 to control wireless communication with the computer unit 330 connected via a network.

The computer unit 330 in FIG. 15 can be a general-purpose computer such as a desktop personal computer, work station and comprises hardware components as a processor, a memory, an ROM, and a storage medium. It includes a USB interface 332 and a wireless NIC 334 to connect with the omnidirectional imaging unit 310 via a USB bus or a network.

The computer unit 330 further comprises a first distortion corrector 202 for position detection, a position detector 204, a table corrector 206, a table generator 208, a second distortion corrector 210 for image synthesis, and an image synthesizer 212. In the present embodiment two partial images captured by multiple imaging units of the lens barrel unit 102 and a position-detection conversion table of the omnidirectional imaging unit 310 are transferred to the computer unit 330 outside via a USB bus or a network.

In the computer unit 330 the first distortion corrector 202 performs distortion correction to $0^{th}$ and $1^{st}$ partial images transferred from the omnidirectional imaging unit 310, referring to the conversion table, to generate 0th and $1^{st}$ corrected images for position detection. The position detector 204 detects a connecting position of the $0^{th}$ and $1^{st}$ corrected images and generates resultant detection data. The table corrector 206 corrects the conversion data in the conversion table on the basis of the detection data. The table generator 208 generates a conversion table for image synthesis from the corrected conversion data by rotational coordinate conversion.

The second distortion corrector 210 corrects distortion of the $0^{th}$ and $1^{st}$ partial images before image synthesis, referring to the image-synthesis conversion table and generates $0^{th}$ and $1^{st}$ corrected images for image synthesis. The image synthesizer 212 synthesizes the $0^{th}$ and $1^{st}$ corrected images to generate a synthetic image in omnidirectional image format.

The computer unit 330 can additionally include a display image generator 214 which executes image processing to project an omnidirectional image onto a planar display device. The computer unit 330 is configured to read a program from a ROM or HDD and expand it on a workspace of a RAM to thereby execute the above-described functions and later-described processing under the control of the CPU.

Figure 16:
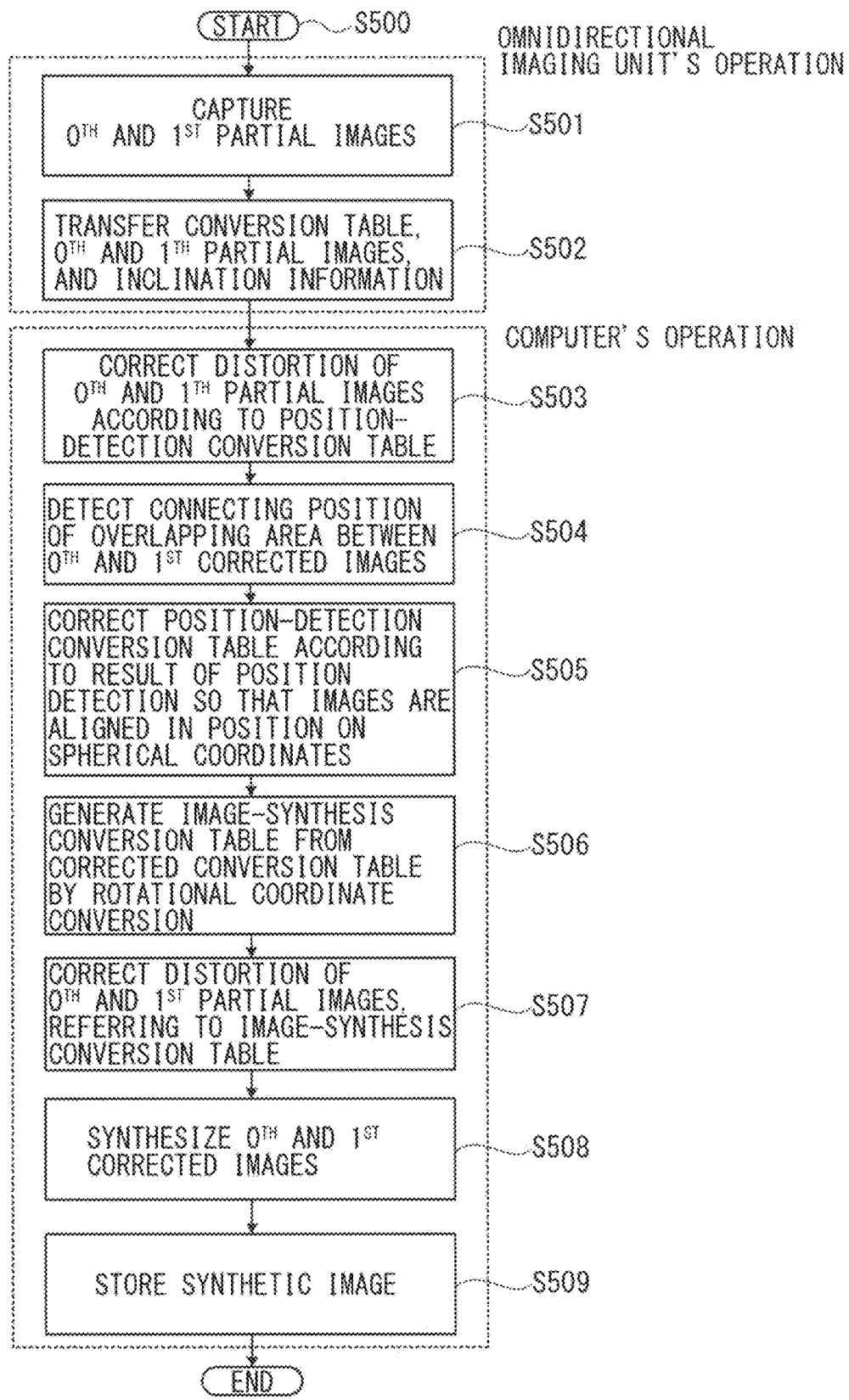
FIG. 16 is a flowchart for omnidirectional image synthesis by the omnidirectional imaging system according to the second embodiment.

FIG. 16 is a flowchart for the omnidirectional image synthesis of the omnidirectional imaging system 300 according to the present embodiment, describing from an input of a captured image from the omnidirectional imaging unit 310 to storing of the image in the computer unit 330.

The operation starts when a shooting instruction is issued in response to press-down of the shutter button of the omnidirectional imaging unit 310, for example. First, the omnidirectional imaging unit 310 executes the processing.

In step S501 the two solid-state image sensors 22A, 22B of the omnidirectional imaging unit 310 capture $0^{th}$ and $1^{st}$ partial images. In step S502 the omnidirectional imaging unit 310 transfers the $0^{th}$ and $1^{st}$ partial images together with the position-detection conversion table to the computer unit 330 via the USB bus or network. In addition inclination information obtained by the triaxial acceleration sensor 120 is transferred to the computer unit 330 if the computer unit 330 executes inclination correction.

The above conversion table can be transferred once when the omnidirectional imaging unit 310 and the computer unit 330 recognize each other. That is, it is unnecessary to transfer the conversion table to the computer unit 330 every time images are transferred. For example, the position-detection conversion table is stored in a not-shown SDRAM and read and transferred therefrom. This completes the operation of the omnidirectional imaging unit 310.

In step S503 the computer unit 330 executes distortion correction to the $0^{th}$ and $1^{st}$ partial images transferred from the first distortion corrector 202, referring to the conversion table, to acquire $0^{th}$ and $1^{st}$ corrected images. If the computer unit 330 executes inclination correction, the conversion data in the conversion table can be corrected in advance according to transferred inclination data relative to a vertical direction. In step S504 the position detector 204 detects a connecting position of the overlapping area between the $0^{th}$ and $1^{st}$ corrected images to obtain resultant detection data. In step S505 the table corrector 206 corrects the data in the conversion table according to the detection data so that the images are aligned in position on the spherical coordinates. In step S506 the table generator 208 generates a conversion table for image synthesis from the corrected conversion table by rotational coordinate conversion.

In step S507 the second distortion corrector 210 executes distortion correction to the original $0^{th}$ and $1^{st}$ partial images, referring to the image-synthesis conversion table, to acquire the $0^{th}$ and $1^{st}$ corrected images for image synthesis. In step S508 the image synthesizer 212 synthesizes the $0^{th}$ and $1^{st}$ corrected images. Thus, a single omnidirectional image is generated from two partial images captured by the fisheye lenses. In step S509 the computer unit 330 stores a generated omnidirectional image in an external storage, completing the operation.

Note that the operation in the flowchart of FIG. 16 can be executable by a program on the computer. That is, the CPU controlling the operation of the omnidirectional imaging unit 310 and the CPU controlling the operation of the computer unit 330 each read a program from a storage as ROM or RAM and expand it on the memory to execute their respective processings of the omnidirectional image synthesis. FIGS. 15 and 16 show a separate type omnidirectional imaging system by way of example and the present embodiment should not be limited thereto. The functions of the omnidirectional imaging system can be distributed to 1 or more imaging units and 1 or more computer systems in various types of configuration.

According to the above-described embodiments it is made possible to realize an image processor, image processing method and program, and an imaging system which can accurately connect captured images even with use of a lens system having a large amount of distortion.

The above embodiments have described an example where partial images are captured almost concurrently by different lens systems. Alternatively, partial images can be captured by the same lens system at different points of time from a certain shooting point in different orientations. Further, the present invention is applicable to the synthesis of three or more overlapped partial images captured by one or more lens systems in replace of the two overlapped partial images captured by the lens system having an angle of view over 180 degrees. Moreover, the present invention is applicable to an omnidirectional imaging system incorporating a super wide-angle lens instead of the imaging system using the fisheye lenses.

The functions of the omnidirectional imaging system can be realized by a computer-executable program written in legacy programming language such as assembler, C, C++, C#, JAVA® or object-oriented programming language. Such a program can be stored in a storage medium such as ROM, EEPROM, EPROM, flash memory, flexible disc, CD-ROM, CD-RW, DVD-ROM, DVD-RAM, DVD-RW, blue ray disc, SD card, or MO and distributed through an electric communication line. Further, a part or all of the above functions can be implemented on, for example, a programmable device (PD) as field programmable gate array (FPGA) or implemented as application specific integrated circuit (ASIC). To realize the functions on the PD, circuit configuration data as bit stream data and data written in HDL (hardware description language), VHDL (very high speed integrated circuits hardware description language), and Verilog-HDL stored in a storage medium can be distributed.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An image processor, comprising:
   circuitry configured to:
   convert input images, having a first coordinate system, into converted images in a second coordinate system different from the first coordinate system according to first conversion data based on a projection model, the first conversion data including arrays for a conversion of coordinate values from the first coordinate system to the second coordinate system;
   for each respective pixel of an overlapping area of a first image and a second image of the converted images:
      set a pixel block of predetermined dimensions around the respective pixel in the overlapping area of the first image as a pattern image; and
      perform pattern matching, according to a correlation coefficient, on the second image at the respective pixel while moving the pattern image vertically and horizontally to find a pixel connecting position in the second image that correspond to the respective pixel in the first image;
   detect, according to the pattern matching, connecting points of the overlapping area between the first image and the second image;
   correct the arrays of the first conversion data according to the connecting points to produce corrected first conversion data; and
   generate second conversion data for image synthesis, the image synthesis to be performed on the input images, the second conversion data being generated by performing a rotational coordinate conversion on the corrected first conversion data,
   wherein the first conversion data and the second conversion data include respective conversion tables including information such that an angle of one pixel is at least 1/10 of a degree in both a θ direction with θ being from 1 to 360 degrees, and a φ direction with φ being from 0 to 180 degrees, and wherein the conversion tables include information indicating at least 3,600*1,800 relations for the first image, and at least 3,600*1,800 relations for the second image.

2. The image processor according to claim 1, wherein an overlapping area between the input images is projected near an equatorial line of a spherical surface.

3. The image processor according to claim 1, wherein the circuitry is further configured to:

convert the input images into new converted images in the second coordinate system according to the second conversion data; and synthesize the new converted images to generate a synthetic image represented in the second coordinate system.

4. The image processor according to claim 3, wherein the input images are captured with the lens system, the lens system having an angle of view of larger than 180 degrees, and the synthetic image is an omnidirectional image represented in a coordinate with at least two arguments.

5. The image processor according to claim 1, wherein the first conversion data is used to define a projection from an input image represented in a plane coordinate system to an image represented in a polar coordinate system with at least two arguments.

6. The image processor according to claim 1, wherein the input images are captured with different lens systems, and the first conversion data includes sets of data for correcting a distortion of the input images captured with the different lens systems for projection.

7. The image processor according to claim 1, wherein the input images are represented in a plane coordinate system, and the converted images are represented in a spherical coordinate system.

8. The image processor according to claim 1, wherein the rotational coordinate conversion corresponds to a 90 degree rotational coordinate conversion.

9. The image processor according to claim 1, wherein the overlapping area is defined by horizontal angles of 0 to 360 degrees, and vertical angles that are start and end points of the vertical angle of an overlapping area preset in accordance with total angle of view of a lens system generating the input images.

10. An image processing method for a computer having circuitry, the method comprising:

receiving, by the circuitry, input images having a first coordinate system;

converting the input images into converted images in a second coordinate system different from the first coordinate system according to first conversion data based on a projection model, the first conversion data including arrays for a conversion of coordinate values from the first coordinate system to the second coordinate system;

for each respective pixel of an overlapping area of a first image and a second image of the converted images:

setting a pixel block of predetermined dimensions around the respective pixel in the overlapping area of the first image as a pattern image; and performing pattern matching, according to a correlation coefficient, on the second image at the respective pixel while moving the pattern image vertically and horizontally to find a pixel connecting position in the second image that correspond to the respective pixel in the first image;

detecting, according to the pattern matching, connecting points of the overlapping area between the first image and the second image;

correcting the arrays of the first conversion data according to the connecting points to produce corrected first conversion data; and generating second conversion data for image synthesis, the image synthesis to be performed on the input images, the second conversion data being generated by performing a rotational coordinate conversion on the corrected first conversion data, wherein the first conversion data and the second conversion data include respective conversion tables including information such that an angle of one pixel is at least 1/10 of a degree in both a θ direction with θ being from 1 to 360 degrees, and a φ direction with φ being from 0 to 180 degrees, and wherein the conversion tables include information indicating at least 3,600*1,800 relations for the first image, and at least 3,600*1,800 relations for the second image.

11. The image processing method according to claim 10, wherein the generating includes finding, by the rotational coordinate conversion, a coordinate value of the second coordinate system of each of the converted images in association with a coordinate value of a coordinate system of a synthetic image, and acquiring a coordinate value of an input image associated with the coordinate value.

12. The image processing method according to claim 10, further comprising:

converting the input images into new converted images in the second coordinate system according to the second conversion data; and synthesizing the new converted images to generate a synthetic image represented in the second coordinate system from that of the input images.

13. The image processing method according to claim 10, wherein the input images are represented in a plane coordinate system, and the converted images are represented in a spherical coordinate system.

14. The image processing method according to claim 10, wherein the rotational coordinate conversion corresponds to a 90 degree rotational coordinate conversion.

15. A non-transitory computer-readable storage medium storing a program for causing a computer to execute an image processing method, the image processing method comprising:

receiving input images having a first coordinate system;

converting the input images into converted images in a second coordinate system different from the first coordinate system according to first conversion data based on a projection model, the first conversion data including arrays for a conversion of coordinate values from the first coordinate system to the second coordinate system;

for each respective pixel of an overlapping area of a first image and a second image of the converted images:

setting a pixel block of predetermined dimensions around the respective pixel in the overlapping area of the first image as a pattern image; and performing pattern matching, according to a correlation coefficient, on the second image at the respective pixel while moving the pattern image vertically and horizontally to find a pixel connecting position in the second image that correspond to the respective pixel in the first image;

detecting, according to the pattern matching, connecting points of the overlapping area between the first image and the second image;

correcting the arrays of the first conversion data according to the connecting points to produce corrected first conversion data; and generating second conversion data for image synthesis, the image synthesis to be performed on the input images, the second conversion data being generated by performing a rotational coordinate conversion on the corrected first conversion data, wherein the first conversion data and the second conversion data include respective conversion tables including information such that an angle of one pixel is at least 1/10 of a degree in both a $\theta$ direction with $\theta$ being from 1 to 360 degrees, and a $\phi$ direction with $\phi$ being from 0 to 180 degrees, and wherein the conversion tables include information indicating at least 3,600*1,800 relations for the first image, and at least 3,600*1,800 relations for the second image.

16. The non-transitory computer-readable storage medium according to claim 15, wherein the input images are represented in a plane coordinate system, and the converted images are represented in a spherical coordinate system.

17. The non-transitory computer-readable storage medium according to claim 15, wherein the rotational coordinate conversion corresponds to a 90 degree rotational coordinate conversion.

18. An imaging system comprising:

an imaging device; and circuitry configured to:

convert input images, captured in different directions by the imaging device and having a first coordinate system, into images in a second coordinate system different from the first coordinate system according to first conversion data based on a projection model, the first conversion data including arrays for a conversion of coordinate values from the first coordinate system to the second coordinate system;

for each respective pixel of an overlapping area of a first image and a second image of the converted images:

set a pixel block of predetermined dimensions around the respective pixel in the overlapping area of the first image as a pattern image; and perform pattern matching, according to a correlation coefficient, on the second image at the respective pixel while moving the pattern image vertically and horizontally to find a pixel connecting position in the second image that correspond to the respective pixel in the first image;

detect, according to the pattern matching, connecting points of the overlapping area between the first image and the second image;

correct the arrays of the first conversion data according to the connecting points to produce corrected first conversion data; and generate second conversion data for image synthesis, the image synthesis to be performed on the input images, the second conversion data being generated by performing a rotational coordinate conversion on the corrected first conversion data, wherein the first conversion data and the second conversion data include respective conversion tables including information such that an angle of one pixel is at least 1/10 of a degree in both a $\theta$ direction with $\theta$ being from 1 to 360 degrees, and a $\phi$ direction with $\phi$ being from 0 to 180 degrees, and wherein the conversion tables include information indicating at least 3,600*1,800 relations for the first image, and at least 3,600*1,800 relations for the second image.

19. The imaging system according to claim 18, wherein the input images are represented in a plane coordinate system, and the converted images are represented in a spherical coordinate system.

* * * * *